Dec. 11, 1951  A. E. HASTINGS  2,577,758
FREQUENCY INDICATOR
Filed Nov. 14, 1945  2 SHEETS—SHEET 1

Inventor
ALLEN E. HASTINGS
By Ralph L. Chappell
Attorney

Dec. 11, 1951            A. E. HASTINGS            2,577,758
FREQUENCY INDICATOR
Filed Nov. 14, 1945                                     2 SHEETS—SHEET 2
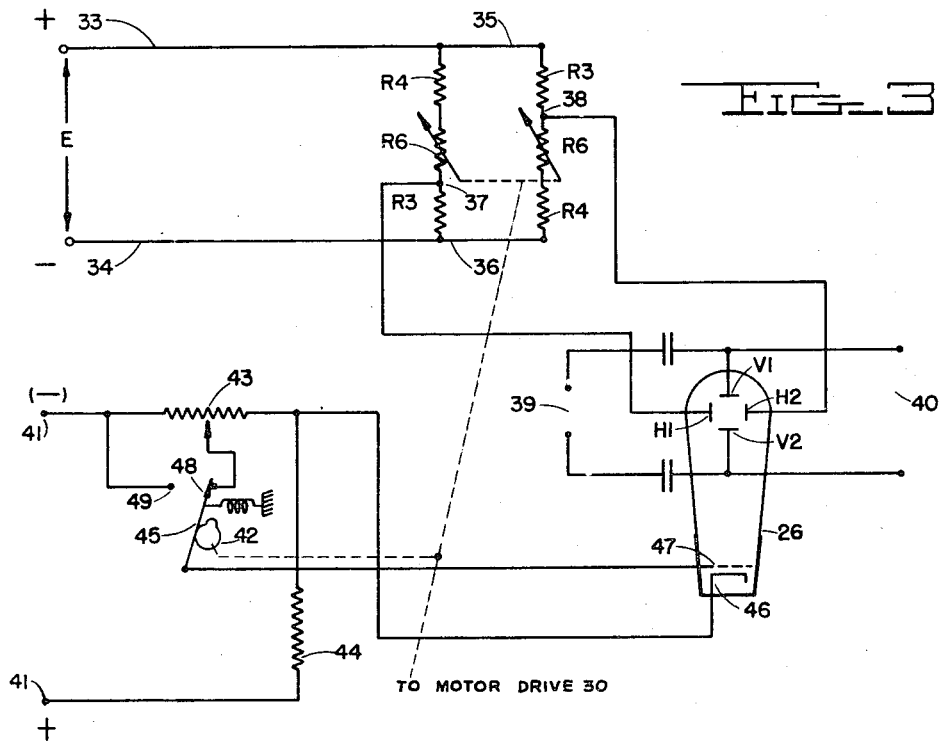
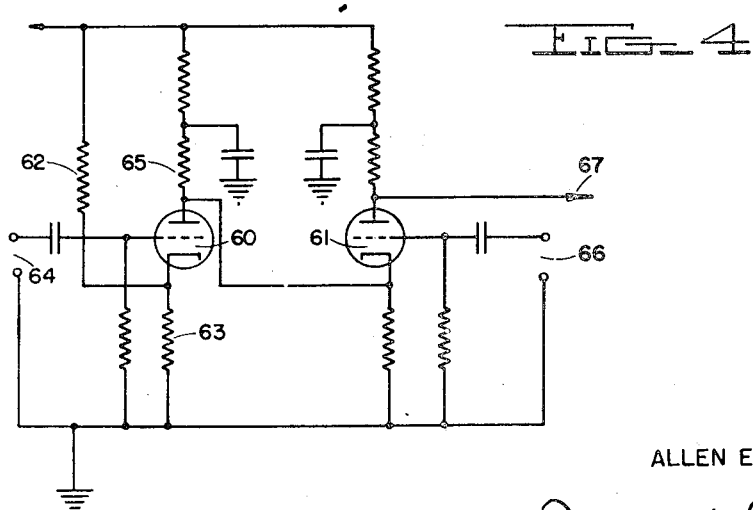
ALLEN E. HASTINGS
By Ralph L. Chappell
Attorney

UNITED STATES PATENT OFFICE 2,577,758

FREQUENCY INDICATOR

Allen E. Hastings, Washington, D. C.

Application November 14, 1945, Serial No. 628,641

8 Claims. (Cl. 175—183)

(Granted under the act of March 3, 1883, as amended April 30, 1928; 370 O. G. 757)

The invention relates in general to a means for analyzing complex waveforms and in particular to a frequency indicator.

In radio and allied arts where slowly changing complex waveforms are frequently encountered, it is often desirable, or necessary, to possess an integrated analysis of such waveform. For instance, in constructing certain types of electronic circuits which are intended either to operate in response to, or to generate, a complex waveform, knowledge of the frequency components comprising such waveform assists immeasurably in obtaining maximum operating performance of the circuit. It is accordingly an object of this invention to provide a quick and visual analysis of a complex waveform.

Another object of this invention is to provide a visual and simultaneous indication of a plurality of the frequency components comprising a complex waveform.

Another object of this invention is to provide a cathode ray tube indicator for simultaneously indicating a plurality of signal frequencies.

Another object of this invention is to provide a plurality of linear frequency scales on a cathode ray tube frequency indicator of the foregoing type.

Other objects and features of the present invention will become apparent upon a careful consideration of the folowing detailed description, when taken together with the accompanying drawings.

Fig. 3 is a detailed circuit diagram of the sweep circuit shown in Fig. 1; and

Fig. 4 is a circuit diagram illustrating in detail a portion of the circuit shown in Fig. 1.

Figure 1:
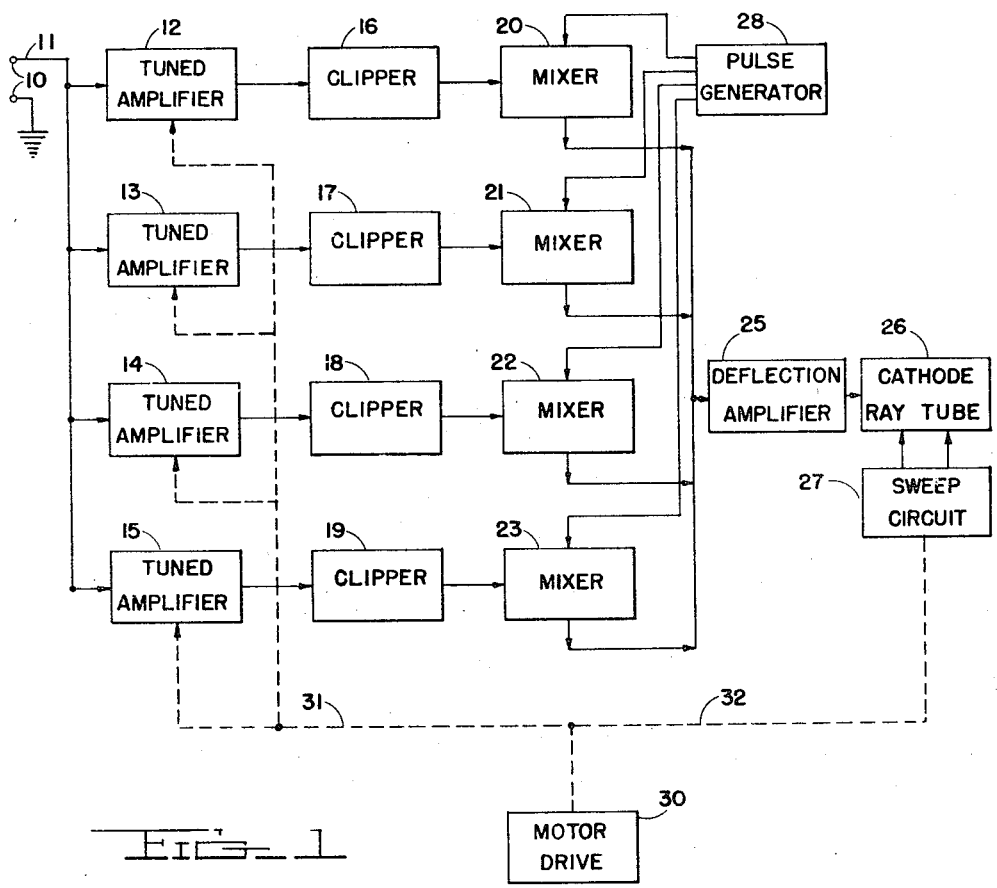
Fig. 1 is a block diagram of a preferred embodiment of the invention.

Briefly, and in accordance with the broader aspects of the invention, the signal or waveform which is to be analyzed is applied through a frequency selective amplifier to a cathode ray tube. The electron beam of the cathode ray tube is swept in one direction by a motor-driven sweep circuit, the driving shaft of which is geared in such a manner to the tuning element of the amplifier as to synchronously change the tuning of the amplifier. In other words, the instantaneous position of the electron beam changes synchronously with the tuning of the amplifier, and the resulting electron beam trace defines the frequency scale of the amplifier. As the pass frequency of the amplifier is swept through the amplifier bandwidth, the existence of each output signal from the amplifier is recorded on the cathode ray tube either as a small bright spot in the beam trace or as a momentary beam excursion perpendicular thereto. In either event, the signal indication occurs at a point along the trace which is governed by the frequency of the signal. In the preferred embodiment of the invention, the latter presentation is used, since the amplitude of the beam excursion can be made proportional to the signal output of the amplifier, which thereby permits an easy indication of the relative amplitudes of the various frequency components comprising the applied signal.

Since a wide variety of frequency components are contained in an ordinary complex wave and since the length of the frequency scale, electron beam trace, is limited to the size of the cathode ray tube, it becomes apparent that only a limited frequency range can be represented on a single electron beam trace. Therefore, in the preferred embodiment of the invention, as organizationally illustrated in Fig. 1, the electron beam of the cathode ray tube indicator is swept in such manner as to provide expansion of the frequency scale. Specifically, the electron beam is so swept as to simultaneously generate a plurality of parallel frequency scales. Associated with each of the frequency scales is a tunable amplifier, each of which is simultaneously tuned over a distinct frequency band. And each is arranged so that its upper frequency limit slightly overlaps the lower frequency limit of the next higher frequency amplifier. Thus, the frequency scale formed by each electron beam trace represents a segment of the entire frequency range, thereby providing, in effect, a continuous frequency scale.

In detail, the signal or complex waveform which is to be analyzed is impressed at terminals 10, and is applied through lead 11 to amplifiers 12, 13, 14, and 15, in parallel. As above mentioned, each amplifier 12, 13, 14, and 15 contains a distinct frequency band, and is simultaneously tuned therethrough. To accomplish the simultaneous (tuning) sweep of the amplifiers, the tuning element of each amplifier is ganged with the tuning elements of the others, as indicated by the dotted line 31, any synchronously driven by motor drive 30.

As is characteristic of all tuned amplifiers, the rate of which any one of the amplifiers 12, 13, 14, or 15 may be tuned over its frequency band depends upon its response time. The response time is in turn directly proportional to the Q of the amplifier circuit, and inversely proportional to the frequency in question. Thus the response time of each amplifier 12, 13, 14, and 15 is different; that of the low frequency amplifier 12, for instance, being the longest because of the low frequencies involved, and that of the high frequency amplifier 15, for instance, being the shortest. Advantage is taken of this feature to extend the overall frequency range of the system. That is, the tuning rate of each amplifier 12, 13, 14, and 15, from low frequency amplifier 12 to high frequency amplifier 15, is increased progressively by progressively increasing the bandwidths of the respective amplifiers. In particular, the ratio of the upper frequency limit to the lower frequency limit of each amplifier is equal; thus, the bandwidth of each amplifier is progressively larger than the preceding amplifier, as governed by its lower frequency limit.

In the analysis of certain complex waveforms, and particularly in the analysis of certain pulse type waveforms having frequency components in the neighborhood of one cycle per second, the system of amplifiers will, by necessity, be required to pass frequencies ranging from one cycle per second, to say, 1000 cycles per second. Frequencies of this order require the use of a highly selective amplifier. The type of amplifier which is herein preferred is the well-known bridge-controlled negative-feedback amplifier similar, for example, to that disclosed by H. H. Scott U. S. Patent 2,173,426. In its general form, an amplifier of this type contains a negative-feedback connection through a resistance-capacitance bridge circuit. The resistance and capacitance elements forming the bridge circuit are so selected that at a particular and variable frequency, known as the "null frequency," the feedback voltage obtained from the bridge is zero, and full gain of the amplifier is realized. At any other frequency, including that which is only slightly removed from the "null frequency," the signal gain of the amplifier is greatly reduced, and a highly selective amplifier results. Tuning of the amplifier is accomplished by making either the resistance elements or the capacitance elements, forming the bridge circuit, variable. Unlike an ordinary inductance-capacitance tuned amplifier, the frequency of tuning of this amplifier varies inversely with the first power of the resistance, or capacitance, whichever is varied.

Figure 2:
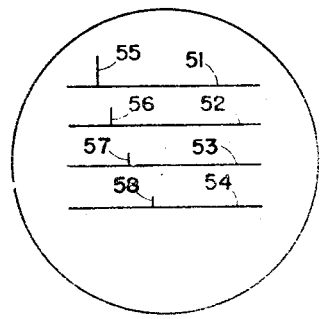
Fig. 2 is a face view of the cathode ray indicator tube shown in Fig. 1.

The output of each amplifier 12, 13, 14, and 15 is fed through a corresponding clipper circuit 16, 17, 18, and 19, and mixer circuit 20, 21, 22, and 23 to a deflection amplifier 25; from whence it is applied to cathode ray tube indicator 26 for presentation. As above-mentioned, beam-deflection type of signal indication is herein preferred. Accordingly, each clipper circuit 16, 17, 18, and 19 acts to eliminate or suppress one half cycle of the sine wave output from the respective amplifier, in order to provide a uni-directional deflection of the cathode ray tube beam. Mixer circuits 20 through 23 each act jointly with pulse generator 28 to provide four different and preferably uniformly spaced beam deflection levels for arranging the respective frequency scales on the cathode ray tube, and also for guiding the output of each amplifier 12, 13, 14, and 15 to its respective frequency scale. In doing so, the mixers are normally held in a blocked condition, and are successively rendered operative in a repetitive manner by pulse generator 28. The latter provides four outputs, each of which yields a repetitive pulse signal of equal duration, and progressively different amplitude. Specifically, the pulse signals from the outputs of pulse generator 28 are progressively smaller in amplitude; that of the first output being greatest in amplitude, and that of the final output being smallest in amplitude. Each of such outputs from the pulse generator 28 occurs in succession and at such a rate relative to the cathode ray beam sweep rate as to provide, in effect, the four continuous and parallel electron beam traces as shown in Fig. 2.

In its preferred form, pulse generator 28 may comprise, for example, four multivibrators connected in cascade; with the output of the final multivibrator coupled back in such a manner, to the input of the first multivibrator as to provide a regenerative pulse generator. A circuit somewhat similar to that disclosed by A. C. Schroeder U. S. Patent 2,402,916 may be used. Each of the multivibrators are of the type that produces, when keyed, a single rectangular wave voltage pulse. Thus, the output of each multivibrator in the circuit immediately follows that of the preceding multivibrator, and, by means known to the art, is made equal in duration and uniformly smaller in amplitude. In the typical case, the pulse signal of the first output of pulse generator 28 is made of maximum amplitude, and is applied through mixer 20 to deflection amplifier 25; from whence it is applied to the vertical deflection plates, for example, of the cathode ray tube indicator 26. This action renders mixer 20 responsive, and simultaneously deflects the electon beam of the cathode ray tube to one horizontal line. Immediately following the termination of a pulse from the first output of pulse generator 28, a pulse of the same duration but of smaller amplitude appears at the second output of pulse generator 28, and is applied through mixer 21 to deflection amplifier 25; from whence it is again applied to the vertical deflecting plates of the cathode ray tube 26. Similarly, this action renders mixer 21 responsive and simultaneously deflects the electron beam of the cathode ray tube to a second horizontal line below that of the first. Likewise, pulses of progressively smaller amplitudes appear in succession at the third and fourth outputs of the generator, and are applied respectively through mixers 22 and 23 to deflection amplifier 25. Again the electron beam is deflected to third and fourth horizontal lines, parallel and below the first and second lines.

As aforementioned, mixers 20, 21, 22, and 23 are normally held blocked and will therefore conduct an output signal from their corresponding amplifiers 12, 13, 14, and 15 to the cathode ray tube 26 only during the time they are rendered responsive by pulse generator 28. Consequently, since a signal output from any one of the amplifiers 12 through 15 will appear on cathode ray tube 26 only during the time its respective mixer 20 through 23 is unblocked by the action of the pulse generator 28 and since the latter operates to arrange the frequency scales on the cathode ray tube 26 in four parallel lines, all signal outputs from amplifier 12 will occur on the top frequency scale, and all those from amplifier 13 on the second scale, and so forth.

To produce the frequency scales, the electron beam of the cathode ray tube 26 is swept in a horizontal direction by a special sweep circuit 27. This sweep circuit, as will hereinafter be described in detail, comprises, in part, a variable resistance which is ganged and varied synchronously, as indicated by the dotted line 32, with the tuning sweep of the amplifiers, and in such a manner as to provide linear frequency scales on the cathode ray tube 26.

For purposes of illustration, a face view of the cathode ray tube indicator 26 is shown in Fig. 2, to which reference is now had. The four horizontal lines 51, 52, 53, and 54 represent the corresponding frequency scales for the tuned amplifiers 12, 13, 14, and 15 respectively. The vertical pips 55, 56, 57, and 58, which appear on the respective frequency scales, represent, by way of example, four typical frequency components of an applied complex waveform. The exact frequency which these indications represent depends upon the distance between the start of the sweep (left-hand end where sweep progresses from left to right) and the indication itself. As shown, the frequency indication 55 appearing on the first frequency scale 51, has the greatest vertical deflection, and consequently represents the frequency component of maximum amplitude in the applied complex wave. The indications designated at 56, 57, and 58 are somewhat smaller in amplitude, and consequently represent frequency components of lesser amplitude.

It will be recognized that since the sweep circuit 27 is motor driven and since the response time for the various amplifiers is usually considerable, the cathode ray tube indicator 26 should be of the long persistence type to prevent an indication occurring early in the sweep, such as 55, from fading out of view before the end of the electron beam sweep is reached. It will also be recognized that, in order to provide good definition in signal indication and to minimize the effects of interruptions in the electron beam traces, the pulse signal outputs of the respective multivibrators comprising the pulse generator 28 must be of short time duration (high repetition rate) in comparison with the horizontal sweep rate of the electron beam, and in comparison with the highest frequency component it is desired to indicate.

In generating the sweep voltage for producing the frequency scales on the cathode ray tube, it will be noted that an ordinary sawtooth sweep voltage is impracticable, in that the sweep voltage rate remains constant while the tuning rate of the amplifiers varies inversely with the first-power change in the tuning element. Thus, to produce a sweep voltage which varies in the same manner that the tuning of the amplifier varies, and therefore to provide a linear frequency scale, a specialized sweep circuit is required. Such a circuit is shown in Fig. 3, to which reference is now had. In its preferred embodiment, this circuit comprises a four-terminal, four-leg, resistance bridge circuit. Across the input terminals 35 and 36 is applied a stabilized direct current voltage which is balanced to ground. That is, the voltage applied to terminal 35, through lead 33, is positive and above ground; that applied to terminal 36, through lead 34, is of equal magnitude negative and below ground. The legs of the bridge connecting terminals 35 and 38, and terminals 36 and 37 comprise equal fixed resistances R3; the legs connecting terminals 35 and 37 and terminals 36 and 38 comprise equal fixed resistances R4 in series with equal variable resistances R6. The output voltage of the bridge is taken from across the terminals 37 and 38, and applied to the horizontal deflecting plates H1 and H2 of the cathode ray tube indicator 26. The magnitudes of the resistance legs comprising the bridge and of the stabilized voltage E applied across terminals 35 and 36 are chosen so that at the start of the sweep, when the resistance of R6 is at a minimum, a maximum voltage difference will appear across terminals 37 and 38, with the voltage at terminal 37 being positive relative to that at terminal 38. At this time, the electron beam of the cathode ray tube 26 is deflected to the far left-hand side of the tube. At the halfway point in the sweep, variable resistances R6 are of such a value that the voltage difference across terminals 37 and 38 is zero and the electron beam of the cathode ray tube is deflected to the center of the tube. At the end of the sweep when variable resistances R6 are at a maximum value, the voltage difference across terminals 37 and 38 is again maximum with terminal 38 being positive relative to terminal 37. At this instant, the electron beam is deflected to the far right-hand side of the tube.

Terminals 39, connected across the vertical deflecting plates V1 and V2 of the cathode ray tube 26, provide an input connection for the output of the beam deflection amplifier 25, shown in Fig. 1. Terminals 40 also connected across the vertical deflecting plates V1 and V2, provide a connection to a beam centering network of known construction. It has been found, by extensive calculations, and empirically verified that exact linearity of the frequency scales is obtained, if $$R_4 = \frac{1}{(a^2-1)} R_6$$

$$R_3 = \frac{a}{(a^2-1)} R_6$$

and $$E = \frac{kl}{2}\left(\frac{a+1}{a-1}\right)$$

where $k$ is the deflection sensitivity of the tube, $a$ is the ratio of upper to lower frequency limits of the scale and $l$ is the length of the cathode ray tube trace.

The return trace of the electron beam, which occurs when the value of variable resistances R6 changes abruptly from a maximum to a minimum at the end of the sweep trace, is blanked by the action of a cam-operated switch 42 and a potential divider circuit, comprising potentiometer 43 and resistance 44 connected in series across a negative voltage source 41. The cathode 46 of the cathode ray tube 26 is connected to the junction point of potentiometer 43 and resistor 44, and the grid 47 is connected through switch 45 to the movable tap on potentiometer 43. The latter provides adjustment of the intensity of the electron beam. Switch 45 is operated by cam 42 which is ganged to the motor drive 30 and rotated with resistances R6 in the sweep circuit. At the end of the sweep trace contact 48, by the action of cam 42, rides over to and contacts terminal 49 which is negative with respect to the cathode. Accordingly, the cathode ray tube beam is blanked until movable contact 48 returns to contact the movable tap of potentiometer 43.

In Fig. 4, to which reference is now had, a detailed circuit diagram, representative of any one of the "clipper" and "mixer" circuits shown in Fig. 1, is disclosed. The clipper circuit comprises a single vacuum tube component 60, which is biased just to cut-off by means of its cathode connection to the junction point of resistance 62 and 63, which are connected between the plate supply and ground. This bias is arranged so that only the positive half cycles of the amplifier output, which is applied to the grid of tube 60 by way of terminals 64, will cause tube 60 to conduct. As tube 60 conducts, a negative half cycle appears across its plate load resistance 65, and is applied, by a direct conductive connection, to the cathode of mixer tube 61. Tube 61 is biased below cut-off potential, by means of its cathode connection to the plate of tube 60. The size of the plate load resistance 65, for tube 60, is selected so that the maximum available negative signal at the plate of tube 60 will not, by itself, be able to cause conduction in tube 61. Tube 61, will however, be rendered conducting when the pulse signal obtained from the corresponding output of pulse generator 28 is applied to its grid by way of terminals 66. As tube 61 is rendered conducting, an output signal appears at plate terminal 67 and is applied to the deflection amplifier 25; for producing vertical deflection of the cathode ray tube beam. In the case where no signal appears at terminals 64, the output at terminal 67 is an inverted replica of the pulse applied at terminals 66. On the other hand, during the time a signal is applied to terminals 64, the output signal at terminal 67 is proportional to the signal sum applied to terminals 64 and 66.

Although I have shown and described only a certain and specific embodiment of this invention it is to be understood that I am fully aware of the many modifications possible thereof.

Therefore this invention is not to be limited except insofar as is necessitated by the prior art and the spirit of the appended claims.

The invention described herein may be manufactured and used by or for the Government of the United States of America for governmental purposes without the payment of any royalties thereon or therefor.

What is claimed is:

1. A frequency indicator, comprising a plurality of frequency selective amplifiers connected to have a common input circuit for receiving the signal to be analyzed, the frequency limits of said amplifiers being staggered so that the upper frequency limit of each overlaps slightly, the lower frequency limit of the next succeeding higher frequency amplifier, a separate tuning element for each of said amplifier for altering the corresponding band pass frequencies thereof, a cathode ray tube, means coupling the outputs from said amplifiers to said cathode ray tube, a variable resistance sweep circuit for sweeping the beam of said tube in one direction, motor means for simultaneously driving the tuning elements of said amplifiers and the variable resistance elements of said sweep circuit, and pulse generating means for deflecting the electron beam of said tube in uniform steps perpendicular to the direction of sweep movement, and at such a rate as to provide a plurality of parallel and distinct electron beam traces equal in number to the number of amplifiers, said last named means also functioning to successively render the output of each amplifier visible on a corresponding one of said electron beam traces.

2. A frequency indicator, comprising a plurality of bridge-controlled negative-feedback amplifiers connected to have a common input circuit for receiving the signal to be analyzed, the frequency limits of said amplifiers being staggered so that the upper frequency limits of each overlaps, slightly, the lower frequency limit of the next succeeding higher frequency amplifier, a separate tuning element for each of said amplifiers for altering the corresponding band pass frequencies thereof, a cathode ray tube, means coupling the outputs from said amplifiers to said cathode ray tube, a variable resistance sweep circuit for sweeping the beam of said tube in one direction, motor means for simultaneously driving the tuning elements of said amplifiers and the variable resistance elements of said sweep circuit, and pulse generating means for deflecting the electron beam of said tube in uniform steps perpendicular to the direction of sweep movement, and at such rate as to provide a plurality of parallel and distinct electron beam traces equal in number to the number of amplifiers, said last named means also functioning to successively render the output of each of said amplifiers visible on a corresponding one of said electron beam traces.

3. A frequency indicator comprising a tunable bridge-controlled negative feedback amplifier channel having an input circuit for receiving the signal to be analyzed and a tuning element for controlling the band pass frequency thereof, a cathode ray tube indicator fed by the output of said amplifier channel, a sweep circuit for sweeping the electron beam of said tube in one direction, comprising, a four-terminal four-leg resistance bridge circuit having a pair of input terminals and a pair of output terminals, a stabilized voltage balanced to ground applied across the input terminals of said bridge, a variable resistance connected in each leg of one pair of opposite legs in said bridge circuit, and means for synchronously driving the tuning element of said amplifier and the variable resistances of said sweep circuit.

4. A frequency indicator comprising a tunable bridge-controlled negative feedback amplifier channel having an input circuit for receiving the signal to be analyzed and a tuning element for controlling the band pass frequency thereof, a cathode ray tube indicator fed by the output of said amplifier channel, a sweep circuit for sweeping the electron beam of said tube in one direction, comprising, a resistance bridge circuit having a pair of input terminals and a pair of output terminals, a fixed resistance connecting a first terminal of said input pair to a first terminal of said output pair, a similar fixed resistance connecting the second terminal of said input pair and said output pair, a series connection of a fixed resistance and a variable resistance connecting the second terminal of said input pair to the first terminal of said output pair, a similar series connection of a fixed resistance and a variable resistance connecting the first terminal of said input pair to the second terminal of said output pair, and means for synchronously driving the tuning element of said amplifier and the variable resistances of said sweep circuit.

5. A frequency indicator comprising a plurality of frequency selective amplifier channels each tunable over a distinct frequency band, a common signal input connection for said amplifier channels for receiving the signal to be analyzed, a cathode ray tube indicator, separate transmission channel means coupling the output from each of said amplifier channels to said indicator, means including an electron beam deflection circuit for deflecting the electron beam of said cathode ray tube indicator in a first direction and to simultaneously shift the tuning of said receiver channels over their respective frequency bands, a pulse generator coupled to said cathode ray tube indicator for cyclically and rapidly deflecting the electron beam thereof in a second direction perpendicularly to the first direction in uniform steps to provide a plurality of distinct parallel electron beam traces equal in number to the number of amplifier channels, said pulse generator being further coupled to said transmission channels to sequentially and cyclically render the output of each of said amplifier channels visible on a corresponding one of said electron beam traces.

6. A frequency indicator comprising a plurality of frequency selective amplifier channels each tunable over a distinct frequency band, a common signal input connection for said amplifier channels for receiving the signal to be analyzed, means synchronously tuning said channels over their respective frequency bands, means including a pulse generator operative to sequentially render said amplifier channels operative to deliver output signals in sequential alternation at a rate high in comparison to the tuning rate thereof, a cathode ray tube indicator coupled to the output of said amplifier channels, an electron beam deflection circuit for deflecting the electron beam of said tube in a first direction synchronously with the tuning of said amplifier channels, and means including said pulse generators for deflecting the electron beam of said cathode ray tube indicator in uniform steps in a second direction perpendicular to the first direction and in the same sequence that said amplifier channels are rendered operative.

7. A frequency analyzer comprising a plurality of frequency selective amplifier channels each tunable over a distinct frequency band, a common input signal path for said amplifier channels for applying the signals to be analyzed to said channels in parallel, a cathode ray tube indicator coupled to the output of said amplifier channels, means deflecting the electron beam of said cathode ray tube indicator in a first direction and for synchronously tuning said channels over their respective frequency bands, and means for deflecting the electron beam in uniform steps perpendicularly to the first direction at a rate operative to provide a plurality of distinct parallel beam traces one for each amplifier channel, said last named means being further coupled to said amplifier channels to render the latter operative to deliver output signals to said indicator tube in sequential alternation.

8. A frequency analyzer comprising a plurality of frequency selective amplifier channels each tunable over a distinct frequency band and each having a distinct bandwidth increasing progressively from the lowest frequency amplifier channel to the highest frequency amplifier channel, a common signal input connection for said amplifier channels for receiving the signal to be analyzed, a cathode ray tube indicator coupled to the output of said amplifier channels, means coupled to said amplifier channels for simultaneously tuning same over their respective frequency bands, means coupled to said cathode ray tube indicator for deflecting the electron beam of said cathode ray tube over the face of the tube in synchronism with the tuning of the amplifier channels, and means associated with the cathode ray tube indicator for rendering the output from said amplifier channels visible on said cathode ray tube in sequential alternation.

ALLEN E. HASTINGS.

REFERENCES CITED

The following references are of record in the file of this patent:

UNITED STATES PATENTS

| Number | Name | Date |
| --- | --- | --- |
| 1,989,677 | Bowles | Feb. 5, 1935 |
| 1,994,232 | Schuck, Jr. | Mar. 12, 1935 |
| 2,084,760 | Beverage | June 22, 1937 |
| 2,173,426 | Scott | Sept. 19, 1939 |
| 2,402,168 | Lifschutz | June 18, 1946 |
| 2,405,238 | Seeley | Aug. 6, 1946 |
| 2,465,500 | Wallace et al. | Mar. 29, 1949 |
| 2,484,618 | Fisher | Oct. 11, 1949 |